(No Model.) 2 Sheets—Sheet 1.

J. W. COLLINS.
CULTIVATOR.

No. 276,160. Patented Apr. 24, 1883.

Attest:
Charles Pickles
Albert G. Fish

Inventor:
John W. Collins
by C D Moody atty (No Model.) 2 Sheets—Sheet 2.
J. W. COLLINS.
CULTIVATOR.
No. 276,160. Patented Apr. 24, 1883.
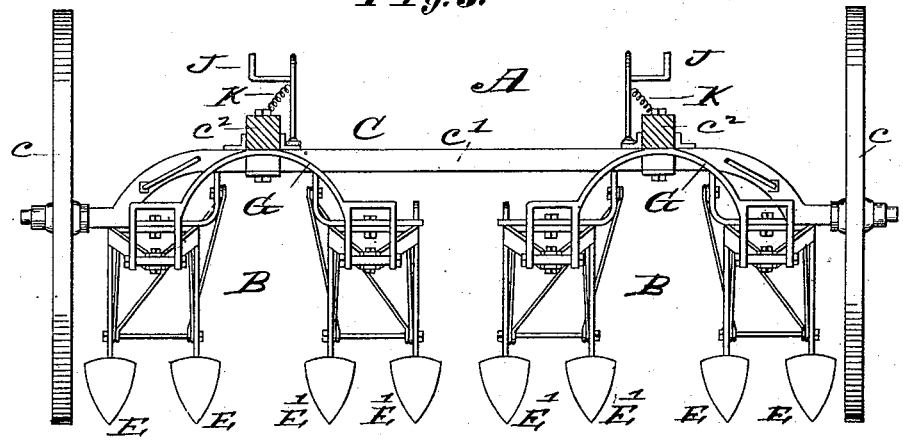
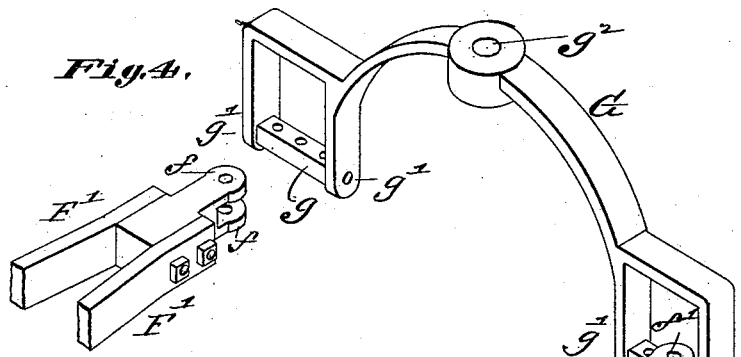
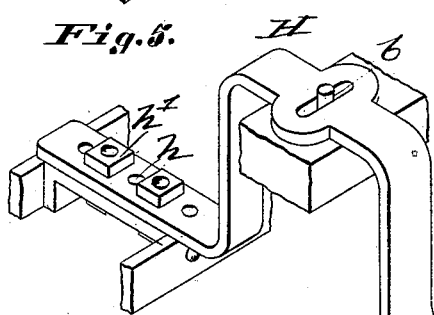
Attest:
Charles Pickles
Albert G. Fish
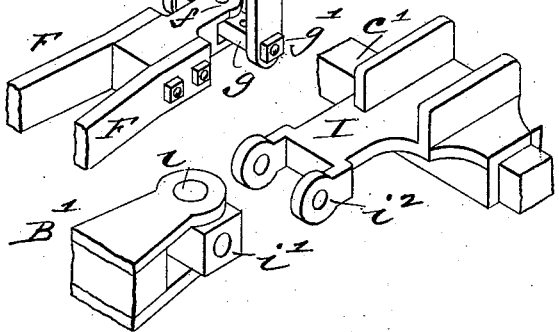
Inventor:
John W. Collins
by C. D. Moody
atty

UNITED STATES PATENT OFFICE.

JOHN W. COLLINS, OF ST. LOUIS, MISSOURI.

CULTIVATOR.

SPECIFICATION forming part of Letters Patent No. 276,160, dated April 24, 1883.

Application filed October 18, 1882. (No model.)

*To all whom it may concern:*

Be it known that I, JOHN W. COLLINS, of St. Louis, Missouri, have made a new and useful Improvement in Cultivators, of which the following is a full, clear, and exact description, reference being had to the annexed drawings, making part of this specification, in which—

Figure 1:
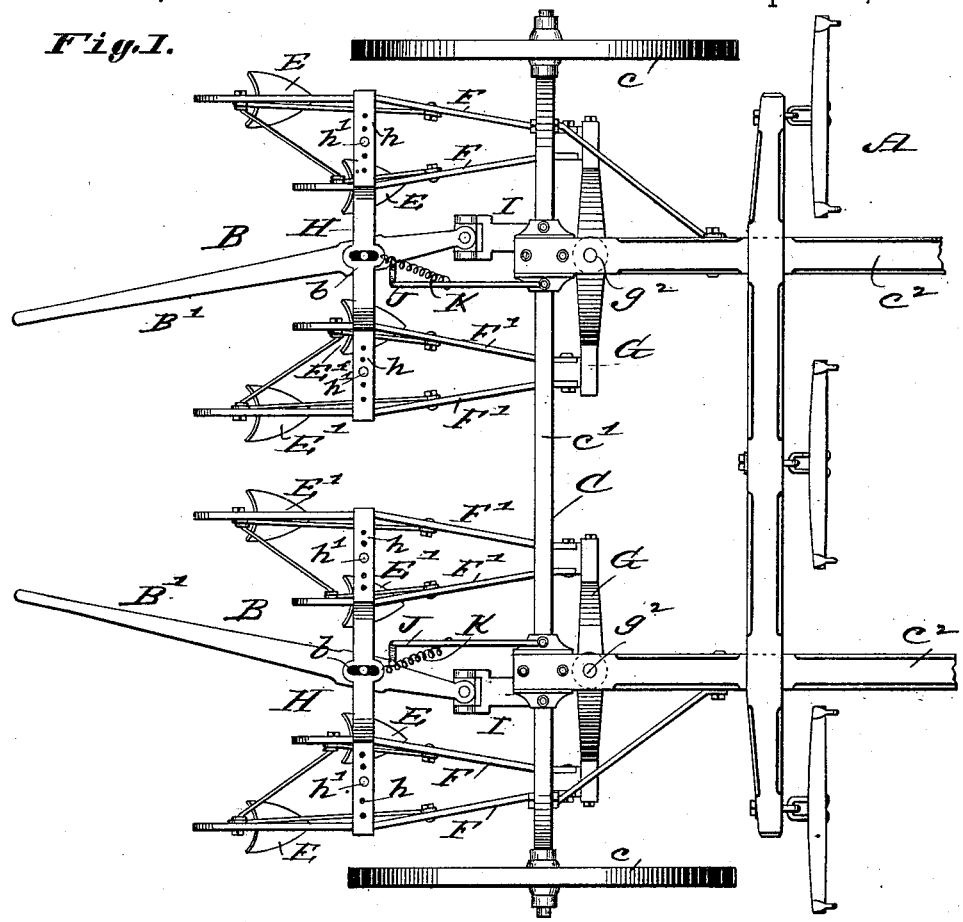
Figure 2:
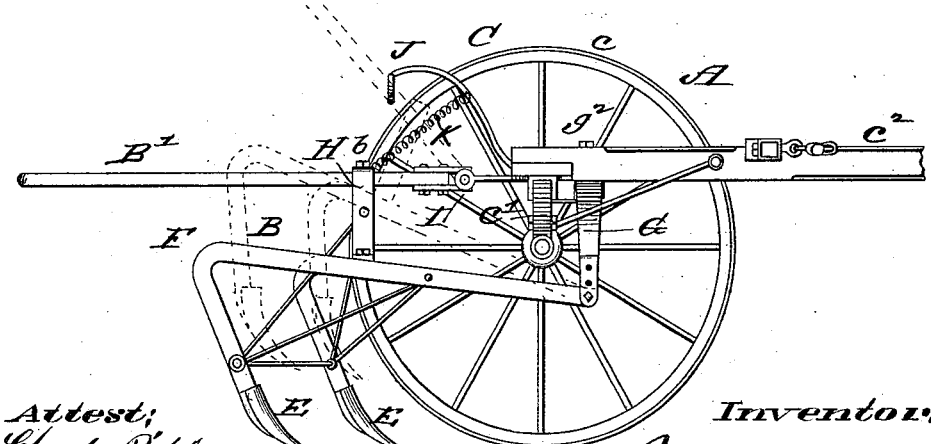

Figure 1 is a plan of the improved implement; Fig. 2, a side elevation; Fig. 3, a front elevation, the tongues being in section; and Figs. 4, 5, 6, details upon an enlarged scale, Fig. 4 being a view in perspective, showing one of the yokes to which the shovel-beams at their forward ends are attached, the forward ends of the two pairs of beams being shown, one pair being attached and the other detached; Fig. 5, a view in perspective of one of the yokes used to connect at their rear ends the beams of each set; and Fig. 6, a view in perspective, showing one of the bearings to which the cultivator-handles are attached and the forward end of the handle, the parts being shown detached.

The same letters of reference denote the same parts.

The present implement is designed for cultivating two rows of corn, &c., at once.

Considered generally, the improved implement consists of a double set of cultivator shovels or plows attached to and drawn by a single carriage which straddles the two rows being cultivated. One of the sets of plows is used in cultivating one of the rows and the other of the sets in cultivating the other row. The two sets are spaced apart to suit the distance between the rows, and are suitably jointed to the carriage to enable the sets to be adjusted laterally and to be raised and lowered, and each set is managed by a single handle, enabling the entire implement to be managed by a single person.

A represents the implement in question. B B represent the two sets of shovels. C represents the carriage, consisting substantially of the wheels $c$ $c$, the axle $c'$, and the tongues $c^2$ $c^2$, the tongues being spaced apart to come respectively over the rows being cultivated, and enabling the implement to be drawn by three horses, one between the tongues and the others at the outer sides respectively of the tongues, as indicated in Fig. 1.

The sets B B might each consist of two shovels or plows only. I preferably use four, E E E' E', in each set, and when four shovels are employed the two shovels E E are connected to move as one part and the shovels E' E' as one part—that is, the shovel-beams F F of the shovels E E are rigidly and permanently connected, and at their forward ends are jointed, as one part, to a yoke, G, at one end thereof, and the shovel-beams F' F' of the shovels E' E' are similarly connected together, and at their forward ends similarly jointed to the other end of the yoke G. At or toward their rear ends the beams F F and the beams F' F' are connected by means of a yoke, H. This connection is such as to enable the beams F F and the beams F' F' to be set closer together and farther apart, according as it is desired to plow nearer to or farther from the row. To this end the yoke H has a series, $h$ $h$, of perforations, enabling the bolts $h'$ $h'$ used in connecting the yoke and beams to be inserted variously to suit the required adjustment of the beams F F and F' F'. The connections of the beams F F F' F' with the yoke G are such as to enable the beams F F and F' F' to be thus brought nearer together or spaced farther apart. The connections with the yoke G are also such as to enable the beams F F F' F' to be lifted and lowered upon the yoke G as a fulcrum. These connections are shown more distinctly in Fig. 4, the yoke having the horizontally-arranged bars $g$ $g$, journaled in the yoke at $g'$ $g'$, and the pairs F F and F' F' of beams being each provided with the eyes $f$ $f$, which are pivoted to the bars $g$ $g$ by means of a bolt, $f'$, passing vertically through the eyes and bars $g$ $g$—that is, the beams swing laterally on the bolts $f$ $f$, and the beams and bars $g$ $g$ turn vertically in the bearings $g'$ $g'$. Any other form of connection, however, will answer, provided it enables the beams F F F' F' to be thus moved horizontally and vertically upon the yoke G. The preferable form of the yoke G is that shown in Fig. 4, and the preferable form of the yoke H, as well as mode of connecting the yoke H with the beams F F F' F', is that shown in Fig. 5, both of the yokes G H being suitably arched to pass over the row being cultivated. The plows in each of the sets B B are similarly connected together and with the carriage. The yokes G G, at their centers $g^2 g^2$, are swiveled to the carriage, so that each set B of plows can be swung laterally. The yokes G G are preferably swiveled to the tongues $c^2$ forward of the axle $c'$. Each set B and B is furnished with a handle, B' B', by means of which the sets B B can be controlled, moved closer together and farther apart, as well as lifted and lowered. The handles B' B' are preferably made to act as levers, the forward ends of the handles being swiveled to the bearings I I, substantially as shown in Figs. 1, 2, 6—that is, so that the handles can be turned upward and laterally, and at $b$ $b$ the handles are jointed to the yokes H H. This enables the operator, by means of the handles, to easily move the sets B B to the right or left, and also to elevate them. By hanging the handles upon the rests J J the shovels can be upheld above the ground. Springs K K assist in lifting the plows, the springs extending from the rests J J to the handles B' B'. The preferable mode of connecting the handles with the bearings I I is that shown— namely, providing the handle at the end with an eye, $i$, journaling a block, $i'$, vertically, and then journaling the block $i'$ horizontally in the clip $i^2$ of the bearing I. The bearing I is suitably attached to the carriage—say to the carriage-axle $c'$, and as shown in Fig. 6.

There are a series of perforations in the bars $g$ $g$ to enable the beams F F and F' F' at their forward ends to be spaced farther apart or closer together.

I claim—

1. In combination with the carriage C, the yoke G, as described, beams F F F' F', connected therewith as set forth, and the arched yoke H, substantially as described.

2. The combination of the carriage C, the sets B B of plows or shovels, the handles B' B', and the rests J J, each provided with springs K, substantially as described.

3. The combination of the carriage C, the shovels E E E' E', the beams F F F' F', the yokes G and H, the bearings I I, and the handles B' B', substantially as described, and for the purpose set forth.

4. The combination of the carriage C, having the tongues $c^2 c^2$, arranged as described, the sets B B of plows or shovels, the yokes G and H, the bearings I I, and the handles B' B', substantially as described.

Witness my hand this 14th day of October, 1882.

JOHN W. COLLINS.

Witnesses:
C. D. MOODY,
ALBERT G. FISH.